(12) United States Patent
Toake et al.

(10) Patent No.: US 10,412,945 B2
(45) Date of Patent: Sep. 17, 2019

(54) DUAL-BEARING REEL

(71) Applicants: Shimano Inc., Sakai, Osaka (JP); Shimano Components (Malaysia) SDN. BHD., Pontian, Johor (MY)

(72) Inventors: Youhei Toake, Sakai (JP); Kunio Takechi, Sakai (JP); Akira Niitsuma, Sakai (JP); Takeshi Ikuta, Sakai (JP); Abu Supian Bin Ahmad, Johor (MY)

(73) Assignees: SHIMANO INC., Sakai, Osaka (JP); SHIMANO COMPONENTS (MALAYSIA) SDN. BHD., Pontian, Johor (MY)

( * ) Notice: Subject to any disclaimer, the term of this patent is extended or adjusted under 35 U.S.C. 154(b) by 149 days.

(21) Appl. No.: 15/728,598

(22) Filed: Oct. 10, 2017

(65) Prior Publication Data
US 2018/0125049 A1    May 10, 2018

(30) Foreign Application Priority Data
Nov. 8, 2016 (JP) ................................. 2016-218114

(51) Int. Cl.
*A01K 89/01* (2006.01)
*A01K 89/015* (2006.01)

(52) U.S. Cl.
CPC .... *A01K 89/01928* (2015.05); *A01K 89/0193* (2015.05)

(58) Field of Classification Search
CPC .......... A01K 89/0192; A01K 89/01928; A01K 89/0193; A01K 89/01931
See application file for complete search history.

(56) References Cited

U.S. PATENT DOCUMENTS

| | | | | |
|---|---|---|---|---|
| 5,415,359 A | * | 5/1995 | Ikuta | A01K 89/0191 242/271 |
| 5,782,420 A | * | 7/1998 | Forslund | A01K 89/0155 242/289 |
| 2005/0211812 A1 | * | 9/2005 | Nakagawa | A01K 89/00 242/223 |
| 2009/0166460 A1 | * | 7/2009 | Kitajima | A01K 89/01931 242/322 |

(Continued)

FOREIGN PATENT DOCUMENTS

JP          2004180530 A       7/2004

*Primary Examiner* — Emmanuel M Marcelo
(74) *Attorney, Agent, or Firm* — United IP Counselors, LLC

(57) ABSTRACT

A dual-bearing reel includes a reel body, a spool and a waterproof member. The reel body includes a first side plate and a second side plate. The spool includes a bobbin trunk and a first flange. The bobbin trunk is rotatably disposed between the first side plate and the second side plate. The first flange is provided on a first side plate-side end of the bobbin trunk and has a larger diameter than the bobbin trunk. The waterproof member has an annular shape and is disposed in a first side plate-side position in the reel body. Additionally, the first flange includes a rib having an annular shape. The rib extends axially outward from the first flange and has a smaller diameter than an outermost diameter part of the first flange. The waterproof member is disposed in adjacent opposition to an inner peripheral surface of the rib of the first flange.

8 Claims, 6 Drawing Sheets

(56) References Cited

U.S. PATENT DOCUMENTS

| | | | |
|---|---|---|---|
| 2010/0006689 A1* | 1/2010 | Ikuta | A01K 89/0179 |
| | | | 242/306 |
| 2015/0272101 A1* | 10/2015 | Kawamata | A01K 89/015 |
| | | | 242/310 |
| 2016/0106083 A1* | 4/2016 | Niitsuma | A01K 89/0192 |
| | | | 242/310 |
| 2016/0345558 A1* | 12/2016 | Niitsuma | A01K 89/0155 |
| 2018/0092343 A1* | 4/2018 | Takechi | A01K 89/0189 |

* cited by examiner

DUAL-BEARING REEL

CROSS-REFERENCE TO RELATED APPLICATIONS

This application claims priority to Japanese Patent Application No. 2016-218114 filed on Nov. 8, 2016, the entirety of which is hereby incorporated by reference in its entirety.

BACKGROUND

Technical Field

The present disclosure relates to a fishing reel, and particularly to a dual-bearing reel.

Background Information

Some well-known fishing reels such as dual-bearing reels are provided with a waterproof structure for preventing intrusion of water into a drag mechanism and the interior of a bearing member. For example, a waterproof structure described in Japan Laid-open Patent Application Publication No. 2004-180530 prevents intrusion of water into a drag mechanism by providing a cover member and an annular brake element with surrounding walls composing a labyrinth structure (a continuous structure of a large number of protrusions and recesses).

The waterproof structure described in Japan Laid-open Patent Application Publication No. 2004-180530 prevents intrusion of water into the drag mechanism by providing the surrounding walls composing the labyrinth structure. In this case, however, each of a plurality of members composing the labyrinth structure is made in a complex shape. Therefore, it is difficult for the respective members to be reliably molded and assembled with good accuracy.

SUMMARY

It is an object of the present disclosure to provide a dual-bearing reel capable of inhibiting intrusion of water into the interior of a bearing member with a simple structure.

A dual-bearing reel according to the present disclosure includes a reel body, a spool and a waterproof member having an annular shape. The reel body includes a first side plate and a second side plate that is disposed at an interval from the first side plate in an axial direction. The spool is rotatably disposed between the first side plate and the second side plate, and includes a bobbin trunk, a first flange and a second flange. A fishing line can be wound about an outer periphery of the bobbin trunk. The first flange is provided on a first side plate-side end of the bobbin trunk, and has a larger diameter than the bobbin trunk. The second flange is provided on a second side plate-side end of the bobbin trunk, and has a larger diameter than the bobbin trunk. The waterproof member is disposed in a first side plate-side position in the reel body. The first flange includes a rib having an annular shape. The rib extends axially outward from the first flange, and has a smaller diameter than an outermost diameter part of the first flange. The waterproof member is disposed in adjacent opposition to an inner peripheral surface of the rib of the first flange.

According to the dual-bearing reel, when water intrudes into the reel body through a gap between the reel body and the spool, water can be inhibited from intruding into the interior of a bearing member along the inner periphery of the first flange of the spool by the rib of the first flange and the waterproof member. Therefore, it is possible to inhibit intrusion of water into the interior of the bearing member with a simple structure. Moreover, the spool can be enhanced in strength by the rib provided thereon.

The waterproof member preferably has a disc shape and includes a first outer peripheral part and a second outer peripheral part. The first outer peripheral part is disposed in adjacent opposition to the inner peripheral surface of the rib of the first flange. The second outer peripheral part has a smaller outer diameter than the first outer peripheral part, and is provided axially outward of the first outer peripheral part. In this case, when water intrudes into the reel body along the inner periphery of the first flange of the spool, water is guided to the second outer peripheral part and is then guided therefrom toward the first side plate of the reel body. Thus, it is possible to further inhibit intrusion of water into the interior of the bearing member.

The reel body preferably further includes a boss. The boss protrudes from a first side plate-side toward a bobbin trunk-side and is disposed in an inner peripheral part of the first flange. The waterproof member is made of an elastic material, and is attached to an outer periphery of the boss so as to inhibit water from intruding between the inner peripheral part of the first flange and an outer peripheral part of the boss. In this case, it is possible to inhibit intrusion of water into the interior of the bearing member with a simple structure.

The first flange of the spool preferably further includes at least one protrusion having an annular shape. The at least one protrusion protrudes axially outward from the first flange on an inner peripheral side of the rib of the first flange. The at least one protrusion has a shorter axial length than the rib of the first flange. In this case, even when water intrudes into the reel body and reaches a further inner part of the spool along the rib, the at least one protrusion hinders intrusion of water, whereby it is possible to inhibit intrusion of water into the interior of the bearing member. Additionally, the spool can be enhanced in strength by the at least one protrusion provided thereon.

The inner peripheral surface of the rib is preferably a taper surface slanting such that a diameter of the inner peripheral surface of the rib gradually increases with axially outward extension of the inner peripheral surface of the rib. In this case, when water is moved radially outward by a centrifugal force generated in rotation of the spool, water is smoothly discharged to the outside of the spool by the taper surface. Likewise, even when the spool is not being rotated, water is smoothly discharged to the outside of the spool by the taper surface.

An outer peripheral surface of the rib is preferably a taper surface slanting such that a diameter of the outer peripheral surface of the rib gradually reduces with axially outward extension of the outer peripheral surface of the rib. In this case, when water reaches the waterproof member along the inner periphery of the first flange of the spool, water can be guided therefrom toward the first side plate of the reel body. Hence, it is possible to further inhibit intrusion of water into the interior of the bearing member.

Overall, according to the present disclosure, it is possible to provide a dual-bearing reel capable of inhibiting intrusion of water into the interior of a bearing member with a simple structure.

BRIEF DESCRIPTION OF THE DRAWINGS

Referring now to the attached drawings which form a part of this original disclosure.

DETAILED DESCRIPTION OF EMBODIMENTS

First Preferred Embodiment

Figure 1:
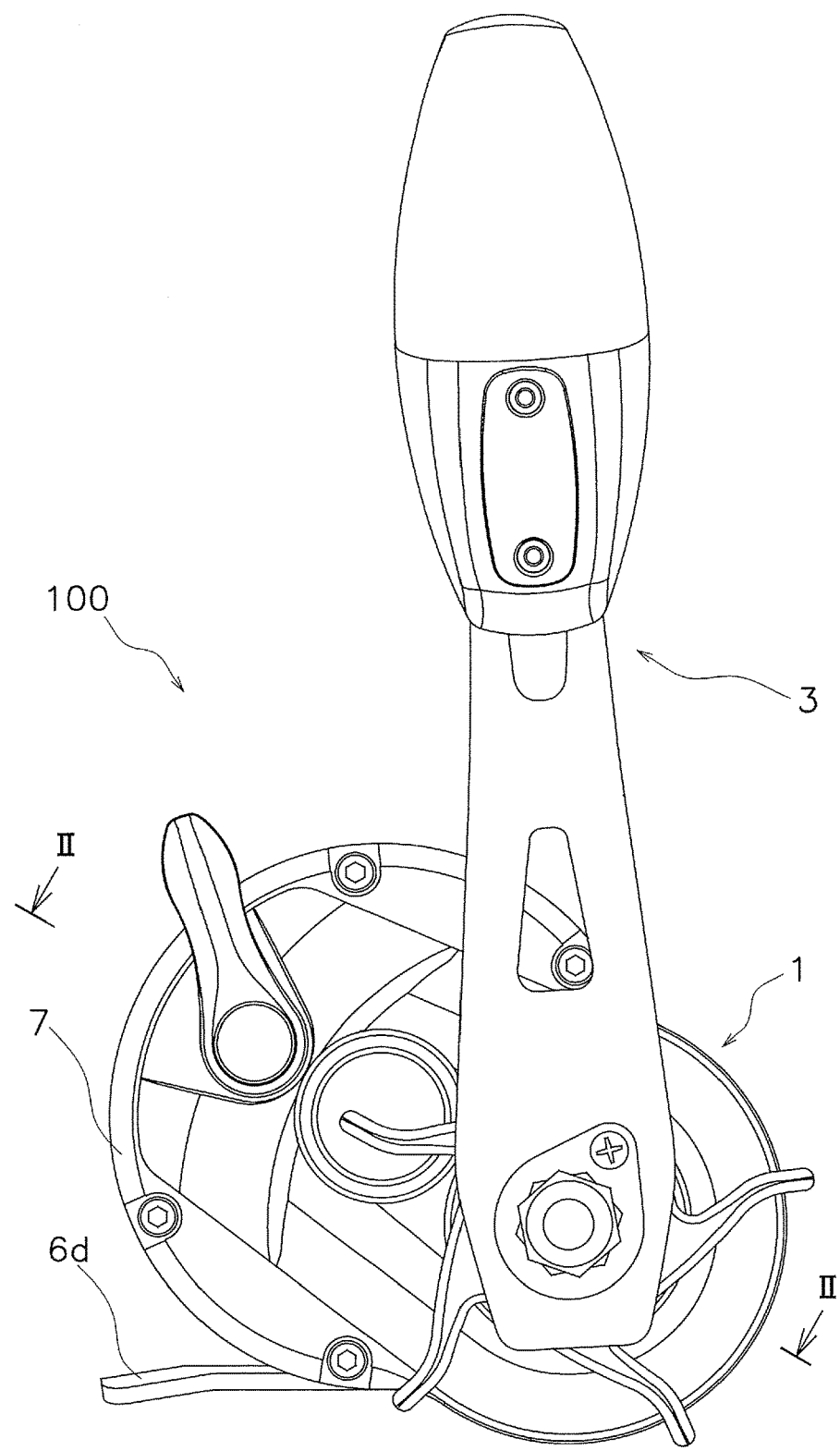
FIG. 1 is a side view of a dual-bearing reel employing a preferred embodiment of the present disclosure.
Figure 2:
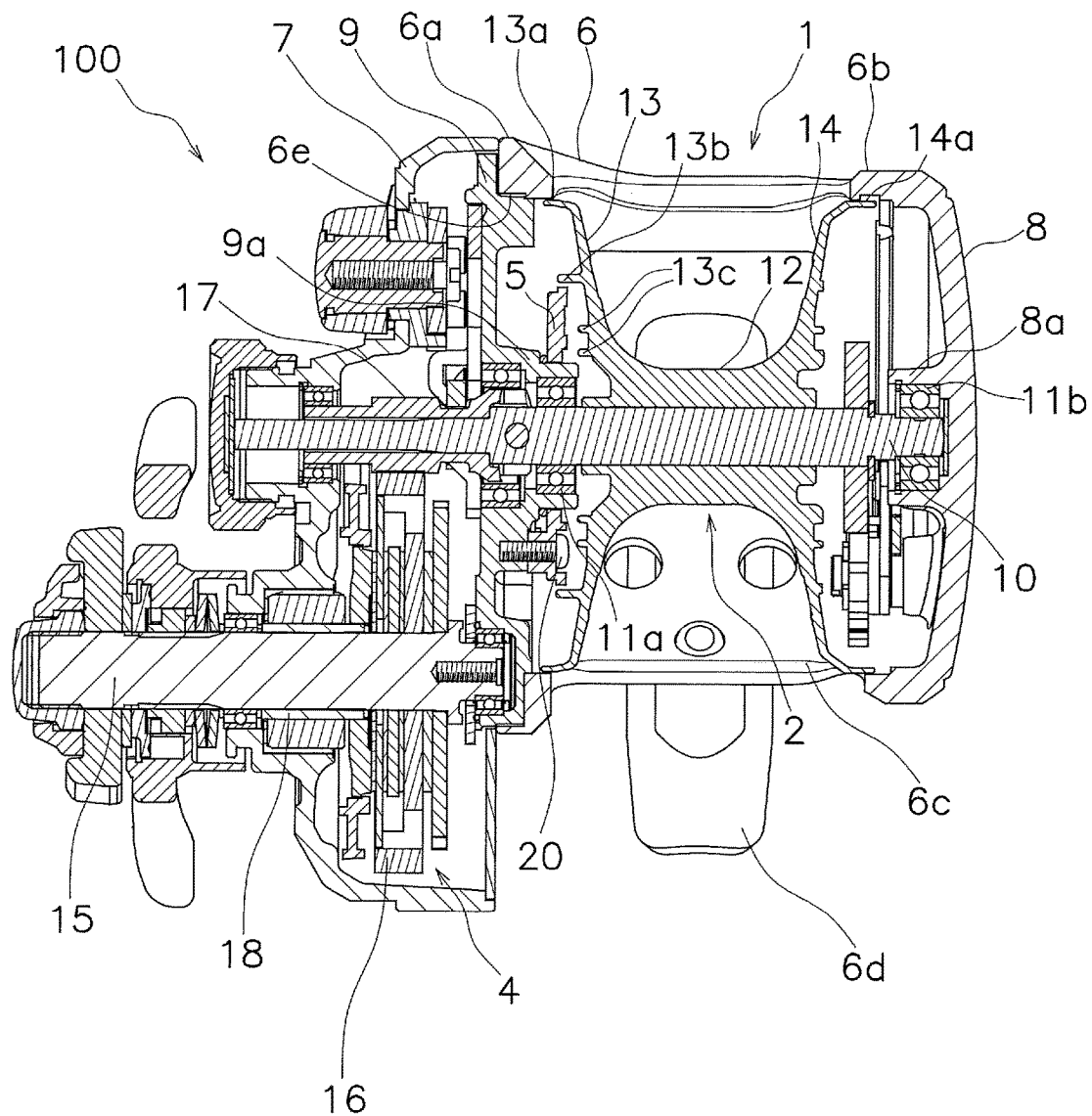
FIG. 2 is a cross-sectional view of FIG. 1 taken along line II-II.

As shown in FIGS. 1 and 2, a dual-bearing reel 100 employing a preferred embodiment of the present disclosure includes a reel body 1, a spool 2, a handle 3, a rotation transmission mechanism 4 and a waterproof member 5.

It should be noted that regarding the directional terms "front", "rear", "right" and "left" in the following explanation, the "front" direction refers to a direction of reeling out a fishing line in a condition that the dual-bearing reel 100 is attached to a fishing rod, and the "right" and "left" directions refer to directions based on a condition that the dual-bearing reel 100 is seen from the "rear" side.

The reel body 1 includes a frame 6, a first side cover 7, a second side cover 8, a front cover (not shown in the drawings) and a mechanism attachment plate 9. The first and second side covers 7 and 8 are attached to the frame 6 so as to cover both sides of the frame 6. The front cover is attached to the front side of the frame 6.

As shown in FIG. 2, the frame 6 includes a first side plate 6a, a second side plate 6b, a plurality of coupling portions 6c and an attachment portion 6d. The first and second side plates 6a and 6b are disposed in opposition to each other at a predetermined interval. The coupling portions 6c couple the first side plate 6a and the second side plate 6b.

The first side plate 6a is an approximately plate-shaped member including an opening 6e. The opening 6e is a circular opening through which the spool 2 is taken out. The second side plate 6b is integrated with the second side cover 8. The attachment portion 6d extends in a back-and-forth direction, and a fishing rod is attached to the lower surface side of the attachment portion 6d.

The mechanism attachment plate 9 is disposed between the first side plate 6a and the first side cover 7. The rotation transmission mechanism 4 is accommodated between the mechanism attachment plate 9 and the first side cover 7.

As shown in FIG. 2, the spool 2 is rotatably disposed between the first side plate 6a and the second side plate 6b. The spool 2 is fixed to a spool shaft 10 penetrating the middle of the spool 2, and is unitarily rotated with the spool shaft 10. Both ends of the spool shaft 10 are supported by bearing members 11a and 11b so as to be rotatable with respect to the reel body 1. The bearing member 11a is disposed in a boss 9a of the mechanism attachment plate 9, whereas the bearing member 11b is disposed in a boss 8a of the second side cover 8.

Figure 3:
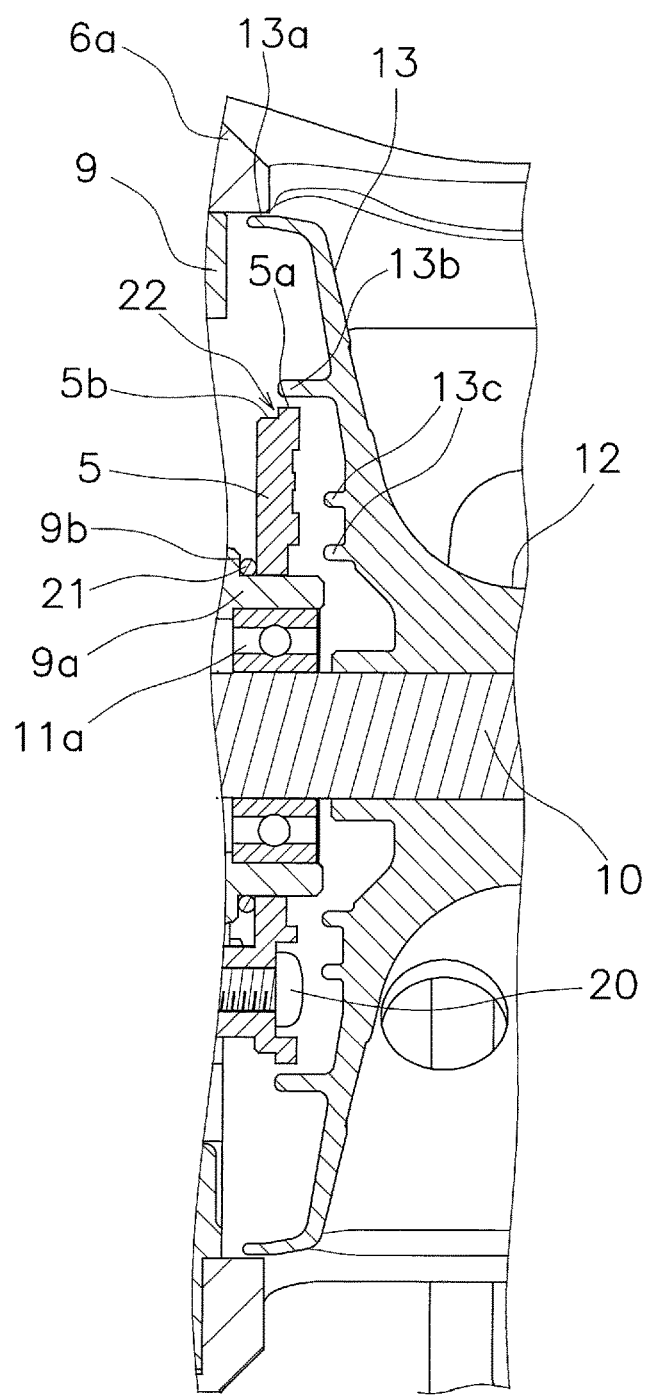
FIG. 3 is a partial enlarged cross-sectional view of a flange of a spool in FIG. 2.

The spool 2 includes a bobbin trunk 12, a first flange 13 and a second flange 14. The bobbin trunk 12 is a part that a fishing line is wound about the outer periphery thereof As shown in FIG. 3, the first flange 13 is provided on the first side plate 6a-side end of the bobbin trunk 12. The first flange 13 has a larger outer diameter than the bobbin trunk 12. The distal end part of the first flange 13 is provided as a cylindrical surface 13a parallel to the spool shaft 10. The outer peripheral surface of the cylindrical surface 13a is disposed in opposition to the inner peripheral surface of the first side plate 6a. Detailedly, the outer peripheral surface of the cylindrical surface 13a and the inner peripheral surface of the first side plate 6a are disposed at a slight gap so as not to make contact with each other. The first flange 13 includes a rib 13b and at least one protrusion 13c.

The rib 13b has an annular shape and extends axially outward (toward the first side plate 6a) from the first flange 13 in parallel to the spool shaft 10. The rib 13b has a smaller outer diameter than an outermost diameter part of the first flange 13. With the rib 13b being provided on the first flange 13, water can be inhibited from intruding into the interior of the bearing member 11a when flowing along the inner periphery of the first flange 13 of the spool 2. Thus, the rib 13b is an example of a first means for inhibiting water from intruding into an interior of a bearing member when flowing along an inner periphery of the first flange. Moreover, the spool 2 can be enhanced in strength by the rib 13b provided thereon. Each of the at least one protrusion 13c has an annular shape and protrudes axially outward (toward the first side plate 6a) from a position located on the inner peripheral side of the rib 13b on the first flange 13. Each of the at least one protrusion 13c protrudes in parallel to the spool shaft 10. Additionally, each of the at least one protrusion 13c has a shorter axial length than the rib 13b. Here, two protrusions 13c are provided on the first flange 13. With the protrusions 13c being provided, even when water intrudes into the reel body 1 and reaches a further inner part of the spool 2 along the rib 13b, the protrusions 13c hinder intrusion of water, whereby it is possible to inhibit intrusion of water into the interior of the bearing member 11a. Thus, the protrusions 13c are examples of means for hindering intrusion of water into the interior of the bearing member. Additionally, the spool 2 can be also enhanced in strength by the protrusions 13c provided thereon.

The second flange 14 is provided on the second side plate 6b-side end of the bobbin trunk 12. The second flange 14 has a larger outer diameter than the bobbin trunk 12. The distal end part of the second flange 14 is provided as a cylindrical surface 14a parallel to the spool shaft 10. The outer peripheral surface of the cylindrical surface 14a is disposed in opposition to the inner peripheral surface of the second side plate 6b. Detailedly, the outer peripheral surface of the cylindrical surface 14a and the inner peripheral surface of the second side plate 6b are disposed at a slight gap so as not to make contact with each other.

As shown in FIG. 1, the handle 3 is rotatably attached to a lateral part of the first side cover 7. The spool 2 is driven by rotational operation of the handle 3 through the rotation transmission mechanism 4.

As shown in FIG. 2, the rotation transmission mechanism 4 includes a drive shaft 15, a drive gear 16 and a tubular pinion gear 17. The rotation transmission mechanism 4 is a mechanism that transmits rotation of the handle 3 to the spool 2. The rotation transmission mechanism 4 is disposed inside the first side cover 7.

The drive shaft 15 is coupled to the handle 3, and is unitarily rotated with the handle 3. It should be noted that the drive shaft 15 is prevented from rotating in a fishing line releasing direction by a one-way clutch 18 disposed on the outer periphery of the drive shaft 15.

The drive gear 16 is attached to the drive shaft 15 and is unitarily rotated with the drive shaft 15.

The pinion gear 17 is meshed with the drive gear 16.

As shown in FIG. 3, the waterproof member 5 is a disc-shaped member, and is disposed in contact with the outer periphery of the boss 9a of the mechanism attachment plate 9 of the reel body 1. The boss 9a protrudes from the first side plate 6a-side toward the bobbin trunk 12-side and is disposed in the inner peripheral part of the first flange 13. The waterproof member 5 is opposed to the first flange 13 of the spool 2 and is disposed on the inner peripheral side of the rib 13b. Additionally, the waterproof member 5 is fixed to the reel body 1 by a plurality of screw members 20 through a seal member 21 having an annular shape.

The seal member 21 is disposed in contact with the waterproof member 5 and a flange part 9b provided on the outer periphery of the boss 9a so as to seal between the inner peripheral part of the waterproof member 5 and the outer peripheral part of the boss 9a.

The waterproof member 5 includes a first outer peripheral part 5a and a second outer peripheral part 5b. The first outer peripheral part 5a is disposed in adjacent opposition to the inner peripheral surface of the rib 13b. Thus, when water intrudes into the reel body through a gap between the reel body and the spool, water can be inhibited from intruding into the interior of a bearing member along the inner periphery of the first flange of the spool by the rib of the first flange and the waterproof member. Accordingly, the waterproof member 5 is an example of a second means for inhibiting water from intruding into the interior of the bearing member when flowing along the inner periphery of the first flange.

The second outer peripheral part 5b is provided axially outward (on the first side cover 7 side) of the first outer peripheral part 5a. The second outer peripheral part 5b has a smaller outer diameter than the first outer peripheral part 5a. Due to this, a step 22 is formed between the first outer peripheral part 5a and the second outer peripheral part 5b. Therefore, when water intrudes into the reel body 1 along the inner periphery of the first flange 13 of the spool 2, water is guided from the rib 13b to the second outer peripheral part 5b. When water is guided to the second outer peripheral part 5b, water is guided from the second outer peripheral part 5b toward the first side plate 6a of the reel body 1 by the step 22 functioning as a wall. When water is guided toward the first side plate 6a, water is released to the outside of the reel body 1 through a water drain hole or so forth (not shown in the drawings) provided in the reel body 1. Thus, with the step 22 provided for guiding water toward the first side plate 6a, it is possible to further inhibit intrusion of water into the interior of the bearing member 11a.

It should be noted that the second outer peripheral part 5b is not herein opposed to the inner peripheral surface of the rib 13b. However, even when the second outer peripheral part 5b is disposed in partial or entire opposition to the inner peripheral surface of the rib 13b, an advantageous effect similar to the above can be obtained by providing the step 22.

Second Preferred Embodiment

A second preferred embodiment will be hereinafter explained. Except for configurations related to a waterproof member 105, a dual-bearing reel according to the second preferred embodiment of the present disclosure is similar to that according to the first preferred embodiment. Therefore, explanation will not be made for configurations similar to those according to the first preferred embodiment.

Figure 4:
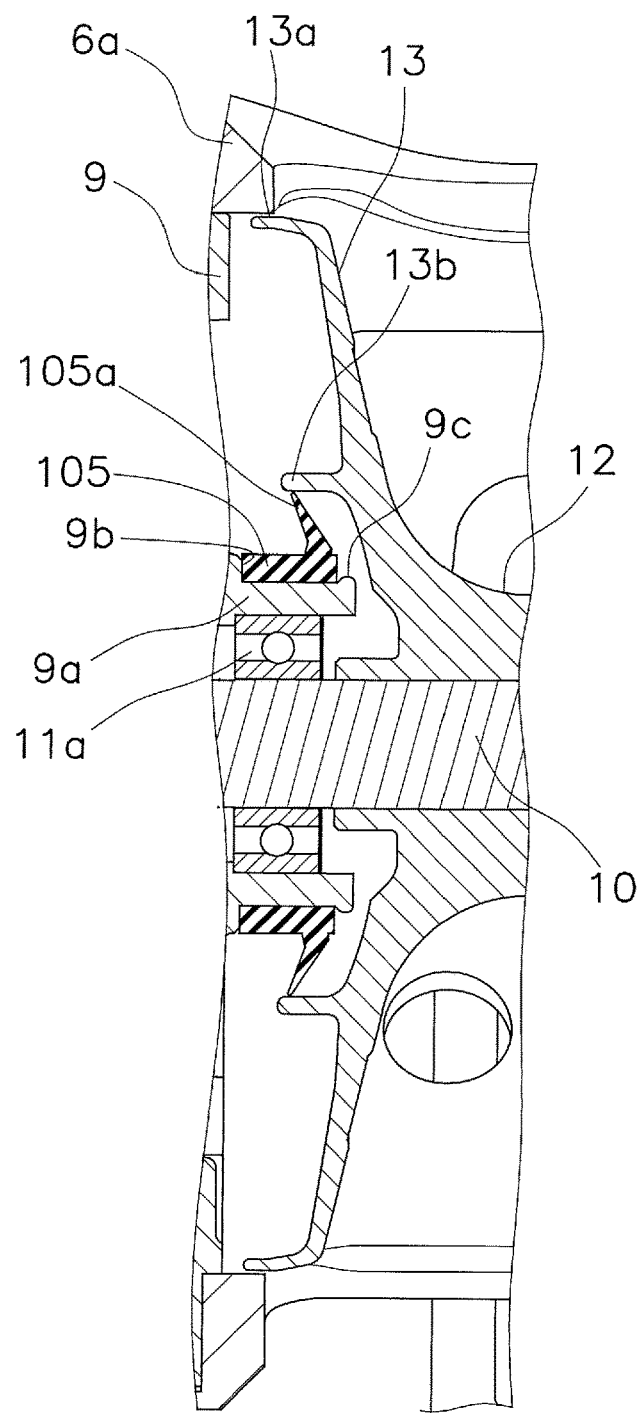
FIG. 4 is a view of a dual-bearing reel according to a second preferred embodiment of the present disclosure and corresponds to FIG. 3.

As shown in FIG. 4, the waterproof member 105 having an annular shape is disposed in the inner peripheral part of the first flange 13 of the reel body 1. Detailedly, the waterproof member 105 is attached to the outer periphery of the boss 9a protruding from the first side plate 6a-side toward the bobbin trunk 12-side. Axial movement of the waterproof member 105 is restricted by the flange part 9b and a protruding part 9c of the boss 9a. The protruding part 9c protrudes radially outward from the distal end of the boss 9a.

The waterproof member 105 includes a lip part 105a extending radially outward. The lip part 105a slants radially outside such that the distal end thereof gets closer to the reel body 1. The distal end of the lip part 105a is disposed in contact to the inner peripheral surface of the rib 13b of the first flange 13.

Other Preferred Embodiments

One preferred embodiment of the present disclosure has been explained above. However, the present disclosure is not limited to the above, and a variety of changes can be made without departing from the scope of the present disclosure.

Figure 5:
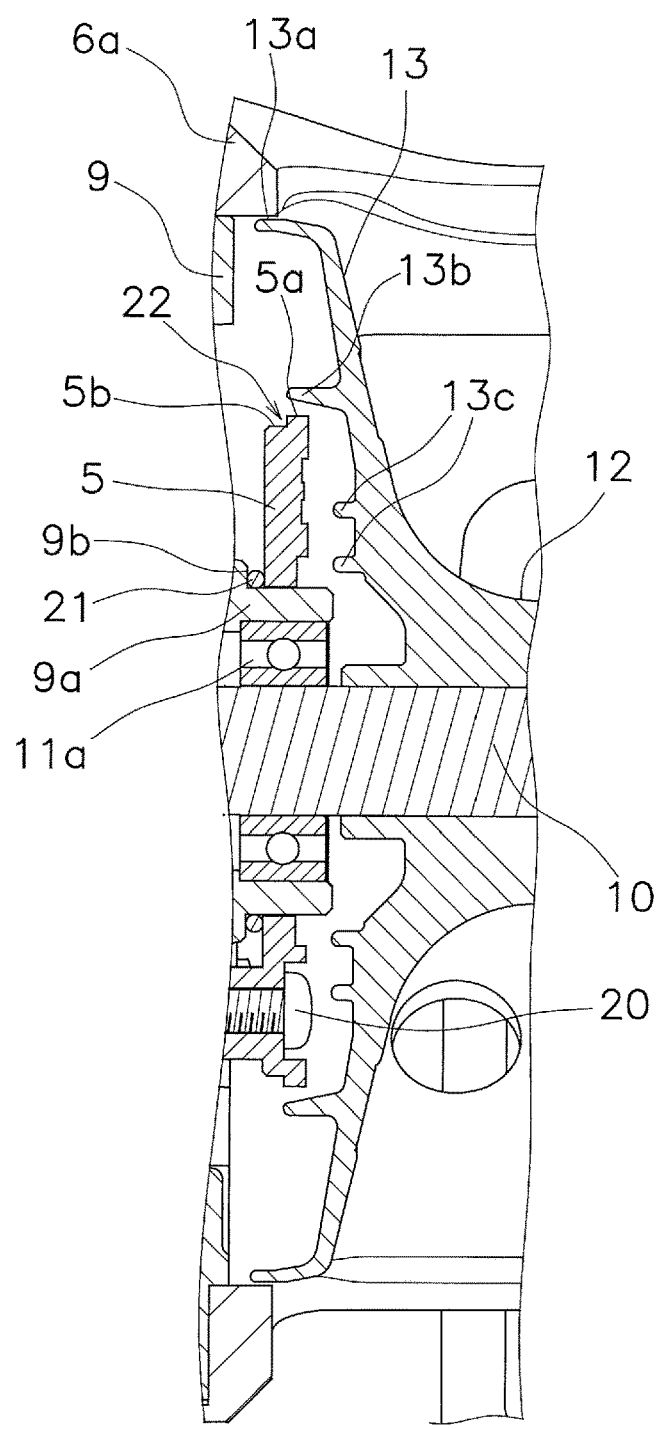
FIG. 5 is a view of a dual-bearing reel according to another preferred embodiment of the present disclosure and corresponds to FIG. 3.
Figure 6:
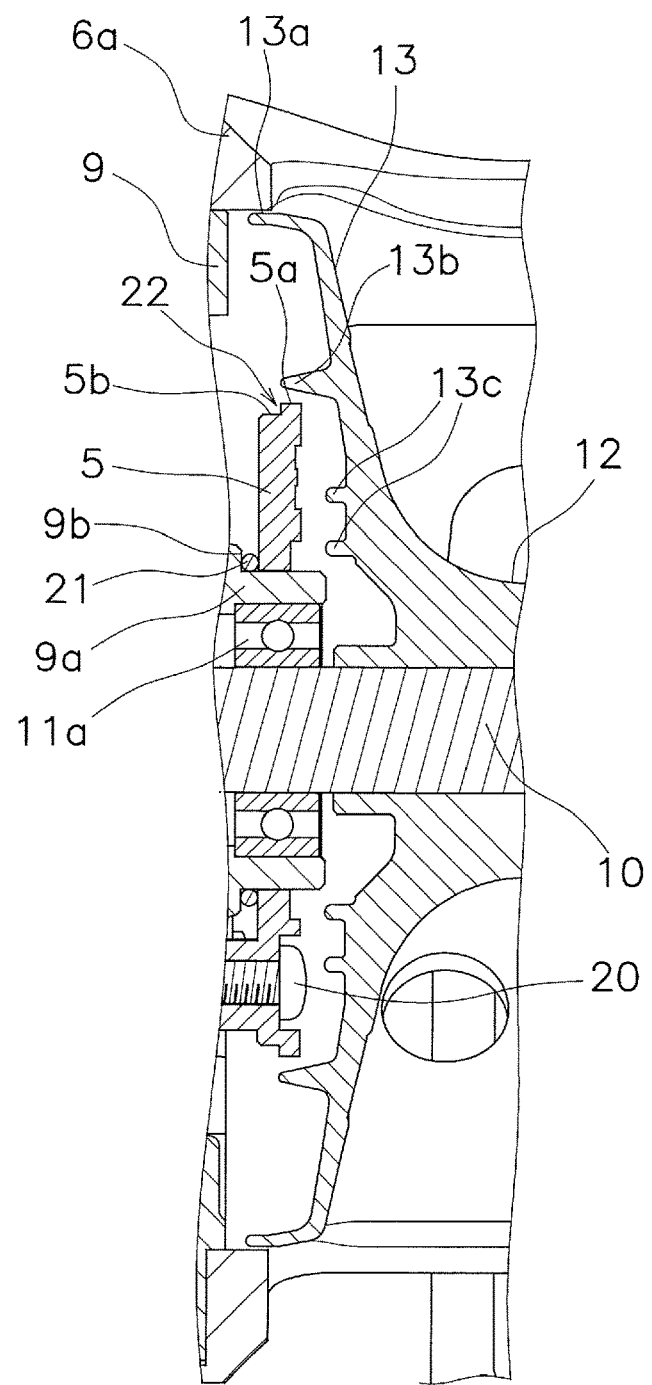
FIG. 6 is a view of a dual-bearing reel according to yet another preferred embodiment of the present disclosure and corresponds to FIG. 3.

(a) In the aforementioned preferred embodiment, the rib 13b of the first flange 13 extends axially outward (toward the first side plate 6a) from the first flange 13 in parallel to the spool shaft 10. However, as shown in FIG. 5, the inner peripheral surface of the rib 13b can be a taper surface slanting such that the diameter of the inner peripheral surface gradually increases with axially outward extension thereof. Alternatively, as shown in FIG. 6, the outer peripheral surface of the rib 13b can be a taper surface slanting such that the diameter of the outer peripheral surface gradually reduces with axially outward extension thereof. Moreover, as shown in FIG. 6, by employing a combination of these configurations, the inner peripheral surface and the outer peripheral surface of the rib 13b can be taper surfaces. Yet alternatively, similarly in the second preferred embodiment, each or either of the inner peripheral surface and the outer peripheral surface of the rib 13b may be a taper surface.

(b) The second outer peripheral part 5b of the waterproof member 5 can be a taper surface slanting such that the diameter of the second outer peripheral part 5b gradually reduces with axial extension thereof. Similarly in this case, when water intrudes into the reel body 1 and reaches the inner part of the spool 2, water can be guided toward the first side plate 6a.

(c) In the aforementioned preferred embodiment, the waterproof member 5 and the rib 13b are provided only on the first flange 13 side. However, the waterproof member 5 and the rib 13b can be provided only on the second flange 14 side or alternatively can be provided on both the first flange 13 side and the second flange 14 side.

(d) In the aforementioned preferred embodiment, the protrusions 13c protrude in parallel to the spool shaft 10. However, the outer peripheral surface of each protrusion 13c can be a taper surface slanting such that the diameter of the outer peripheral surface gradually increases with axially outward extension thereof. In this case, when water intrudes into the reel body 1 and reaching the protrusions 13c, water can be smoothly discharged to the outside of the spool 2 by a centrifugal force to be produced in rotation of the spool 2.

What is claimed is:

1. A dual-bearing reel comprising:
    a reel body including a first side plate and a second side plate, the second side plate disposed at an interval from the first side plate in an axial direction;
    a spool rotatably disposed between the first side plate and the second side plate, the spool including a bobbin trunk, a first flange and a second flange, a fishing line to be wound about an outer periphery of the bobbin trunk, the first flange provided on a first side plate-side end of the bobbin trunk, the first flange having a larger diameter than the bobbin trunk, the second flange provided on a second side plate-side end of the bobbin trunk, the second flange having a larger diameter than the bobbin trunk; and
    a waterproof member having an annular shape, the waterproof member disposed in a first side plate-side position in the reel body, wherein
    the first flange includes a rib having an annular shape, the rib extending axially outward from the first flange, the rib having a smaller diameter than an outermost diameter part of the first flange, and
    the waterproof member is disposed in adjacent opposition to an inner peripheral surface of the rib of the first flange, wherein
    the reel body further includes a boss, the boss protruding from a first side plate-side toward a bobbin trunk-side, the boss disposed in an inner peripheral part of the first flange, and
    the waterproof member is attached to an outer periphery of the boss.

2. The dual-bearing reel according to claim 1, wherein the waterproof member has a disc shape, the waterproof member including a first outer peripheral part and a second outer peripheral part, the first outer peripheral part disposed in adjacent opposition to the inner peripheral surface of the rib of the first flange, the second outer peripheral part having a smaller outer diameter than the first outer peripheral part, the second outer peripheral part provided axially outward of the first outer peripheral part.

3. The dual-bearing reel according to claim 1, wherein the waterproof member is made of an elastic material, the waterproof member configured to inhibit water from intruding between the inner peripheral part of the first flange and an outer peripheral part of the boss.

4. The dual-bearing reel according to claim 1, wherein the first flange of the spool further includes at least one protrusion having an annular shape, the at least one protrusion protruding axially outward from the first flange on an inner peripheral side of the rib of the first flange, and
    the at least one protrusion has a shorter axial length than the rib of the first flange.

5. The dual-bearing reel according to claim 1, wherein the inner peripheral surface of the rib is a taper surface slanting such that a diameter of the inner peripheral surface of the rib gradually increases with axially outward extension of the inner peripheral surface of the rib.

6. The dual-bearing reel according to claim 1, wherein an outer peripheral surface of the rib is a taper surface slanting such that a diameter of the outer peripheral surface of the rib gradually reduces with axially outward extension of the outer peripheral surface of the rib.

7. The dual-bearing reel according to claim 1, further comprising:
    a bearing member that supports an end of a spool shaft of the spool.

8. A dual-bearing reel comprising:
    a reel body including a first side plate and a second side plate, the second side plate disposed at an interval from the first side plate in an axial direction;
    a spool rotatably disposed between the first side plate and the second side plate, the spool including a bobbin trunk, a first flange and a second flange, a fishing line to be wound about an outer periphery of the bobbin trunk, the first flange provided on a first side plate-side end of the bobbin trunk, the first flange having a larger diameter than the bobbin trunk, the second flange provided on a second side plate-side end of the bobbin trunk, the second flange having a larger diameter than the bobbin trunk; and
    a waterproof member having an annular shape, the waterproof member disposed in a first side plate-side position in the reel body, wherein
    the first flange includes a rib having an annular shape, the rib extending axially outward from the first flange, the rib having a smaller diameter than an outermost diameter part of the first flange, and
    the waterproof member is disposed in adjacent opposition to an inner peripheral surface of the rib of the first flange, wherein
    the first flange of the spool further includes at least one protrusion having an annular shape, the at least one protrusion protruding axially outward from the first flange on an inner peripheral side of the rib of the first flange, and
    the at least one protrusion has a shorter axial length than the rib of the first flange.

* * * * *